US008934155B2

(12) United States Patent
Mestha et al.

(10) Patent No.: US 8,934,155 B2
(45) Date of Patent: Jan. 13, 2015

(54) STANDARDIZED MULTI-INTENT COLOR CONTROL ARCHITECTURE

(71) Applicant: Xerox Corporation, Norwalk, CT (US)

(72) Inventors: Lalit Keshav Mestha, Fairport, NY (US); Yao Rong Wang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 49 days.

(21) Appl. No.: 13/781,806

(22) Filed: Mar. 1, 2013

(65) Prior Publication Data

US 2014/0247469 A1    Sep. 4, 2014

(51) Int. Cl.
*H04N 1/60*         (2006.01)
*G06K 15/02*        (2006.01)

(52) U.S. Cl.
CPC .................................. *G06K 15/1802* (2013.01)
USPC .......................................... 358/518; 358/523

(58) Field of Classification Search
None
See application file for complete search history.

(56) References Cited

U.S. PATENT DOCUMENTS

| 5,734,745 | A  | * | 3/1998  | Ohneda .......................... 358/518 |
| 7,003,151 | B2 | * | 2/2006  | Shimada ........................ 358/518 |
| 7,333,239 | B2 | * | 2/2008  | Oshikawa et al. .............. 358/1.9 |
| 7,339,704 | B2 |   | 3/2008  | Mestha et al. |
| 7,965,426 | B2 | * | 6/2011  | Hori et al. ...................... 358/518 |
| 7,978,366 | B2 | * | 7/2011  | Ming ............................. 358/518 |
| 8,159,713 | B2 | * | 4/2012  | Banton et al. .................. 358/518 |
| 8,259,348 | B2 | * | 9/2012  | Kawashima et al. ......... 358/523 |
| 8,508,789 | B2 | * | 8/2013  | Yamada ......................... 358/1.2 |
| 2003/0198379 | A1 | * | 10/2003 | Nielsen et al. ................. 382/162 |
| 2004/0051888 | A1 | * | 3/2004  | Zolliker ........................ 358/518 |
| 2009/0161136 | A1 | * | 6/2009  | Li et al. ........................ 358/1.13 |
| 2012/0105927 | A1 |   | 5/2012  | Mestha et al. |
| 2012/0212752 | A1 |   | 8/2012  | Wang et al. |

OTHER PUBLICATIONS

Mestha et al.: "Advances towards high quality color profiling", Published at the 2nd Annual XIG Conference, May 13-15, 2008, Xerox Corporation, Webster, New York.
Mestha et al.; "Control of Color Imaging Systems: Analysis and Design", CRC Press, ISBN: 9780849337468, 6 Interpolation of Multidimensional Functions, May 2009, pp. 249-302.

* cited by examiner

*Primary Examiner* — Scott A Rogers
(74) *Attorney, Agent, or Firm* — Pillsbury Winthrop Shaw Pittman, LLP

(57) ABSTRACT

A color management system includes an input device, an input processor, and a plurality of print engines. The input processor is configured to transform, using an input transformation stored on the input device, the digital image in an input source color space to a digital image in a standardized multi-color color space. A print engine processor of the print engine is configured to receive the digital image in the standardized multi-color color space from the input processor and transform, using a print engine transformation stored on the print engine, the digital image in the standardized multi-color color space to a digital image in a print engine multi-color color space. The input transformation includes a color gamut coverage at least equal to color gamut coverage of all the print engines in the color management system.

21 Claims, 5 Drawing Sheets

STANDARDIZED MULTI-INTENT COLOR CONTROL ARCHITECTURE

BACKGROUND

1. Field

The present disclosure relates to systems and methods for providing standardized multi-intent color control architecture for improved color consistency across a plurality of print engines in a color management system.

2. Description of Related Art

To meet customer demand, image output devices such as an image printing system or a display need to produce a consistent spectrum of colors over time. Customers would like an image printing system to produce a particular colored document consistently from day to day, or from job to job. To control the color rendering consistency of an image printing system, the image printing system is typically characterized and calibrated prior to being shipped to a customer. The characterization and calibration process produces a set of look-up tables (LUTs) that correlate a standardized set of target colors with the appropriate device dependent color space values necessary to produce the target colors with the image printing system. Characterization and calibration is generally referred to as profiling an image printing system or a device. To accomplish profiling of an image printing system, a spectrophotometer or other image sensing device is used to measure the colorimetric properties of the produced images. These measured colorimetric properties provide an objective basis of comparison to the reference target color set and provide the necessary feedback to iteratively generate accurate device dependent LUTs. Stated another way, device dependent CMYK values for one device can be correlated to the reference target color set, and this reference target color set can be correlated to the device dependent CMYK values for another device so that a LUT can be constructed relating the device dependent CMYK values for the first device to the device dependent CMYK values for the second device. Device profiling can also be applied to a display where an image sensing device is approximately located to the display for colorimetric measurements of the displayed image. In addition, multiple LUTs may be generated for an image output device to account for multiple media types and/or half tone screens.

Unlike a workstation, where processing by the user may be independent of the print engine, a Digital Front End (DFE) or a network of DFEs from multiple vendors are used to convert electronic "master" documents or a job (through a series of image processing applications such as trapping, segmentation, rasterization, color management, image resolution enhancement, and antialiasing) to a form CMYK image data that is specifically designed and optimized for a particular digital printing system. Also, various rendering intents (e.g., perceptual, colorimetric, saturation, etc.,) are implemented in the DFE.

One goal of the color management system is to effectively transform a variety of images to device CMYK color separations for printing by the print engine.

For RGB images, multidimensional, industry standard source profiles are used to transform RGB images to a device-independent color space (L*a*b*/XYZ) and then transform the image data in the device-independent color space to device CMYK color space. These profiles are concatenated to create a device Link RGB to CMYK (3D) profile. In some image printing systems, perceptual LUTs are used to create the device Link RGB to CMYK profile. Black point compensation algorithms or other special rendering adjustments for preference are implemented in the RGB to device CMYK LUTs.

For CMYK images, multidimensional, industry standard CMYK to L*a*b*/XYZ GRACoL source profiles are used to concatenate with the L*a*b*/XYZ to device CMYK profile. The resulting transform is a 4D device Link profile. This 4D LUT is colorimetrically matched without any preference related adjustments.

During Raster Image Processing (RIP), device Link color profiles are applied to RGB or CMYK images. The image pixels are eventually transformed to device CMYK.

This type of architecture makes the DFEs emit device specific color separated images. Also, color adjustments are performed in the DFE. Multiple vendor DFEs make this process complex and cumbersome to manage interactions.

Accordingly, what is needed in this art are systems and methods that provide a standardized architecture that is configured to implement multiple rendering intents inside the print engine, which makes the DFEs independent of print engine specific color management functions.

SUMMARY

In one embodiment, a color management system that includes at least an input device, at least an input processor and a plurality of print engine processors is provided. Each print engine processor is associated with one of a plurality of print engines in the color management system. The input device is configured to receive a digital image in an input source color space. The input processor is operatively associated with the input device and is configured to transform, using an input transformation stored on the input device, the digital image in the input source color space to a digital image in a standardized multi-color color space. Each print engine processor is configured to receive the digital image in the standardized multi-color color space from the input processor and transform, using an engine transformation stored on the print engine, the digital image in the standardized multi-color color space to a digital image in a print engine multi-color color space. The input transformation includes a color gamut coverage at least equal to color gamut coverage of all the print engines in the color management system.

In another embodiment, a method for providing an improved color consistency across a plurality of print engines in a color management system is provided. The plurality of print engines has different number of colorants and different rendering intents. Each print engine has a print engine processor operatively associated therewith. The method is implemented in a computer system comprising one or more processors configured to, execute one or more computer program modules. The method includes transforming, using an input transformation stored on at least an input device, a digital image in an input source color space to a digital image in a standardized multi-color color space; and transforming, using a print engine transformation stored on one of the plurality of print engines, the digital image in the standardized multi-color color space to a digital image in a print engine multi-color color space. The input transformation includes a color gamut coverage at least equal to color gamut coverage of all the print engines in the color management system.

Other objects, features, and advantages of one or more embodiments will become apparent from the following detailed description, and accompanying drawings, and the appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Figure 1:
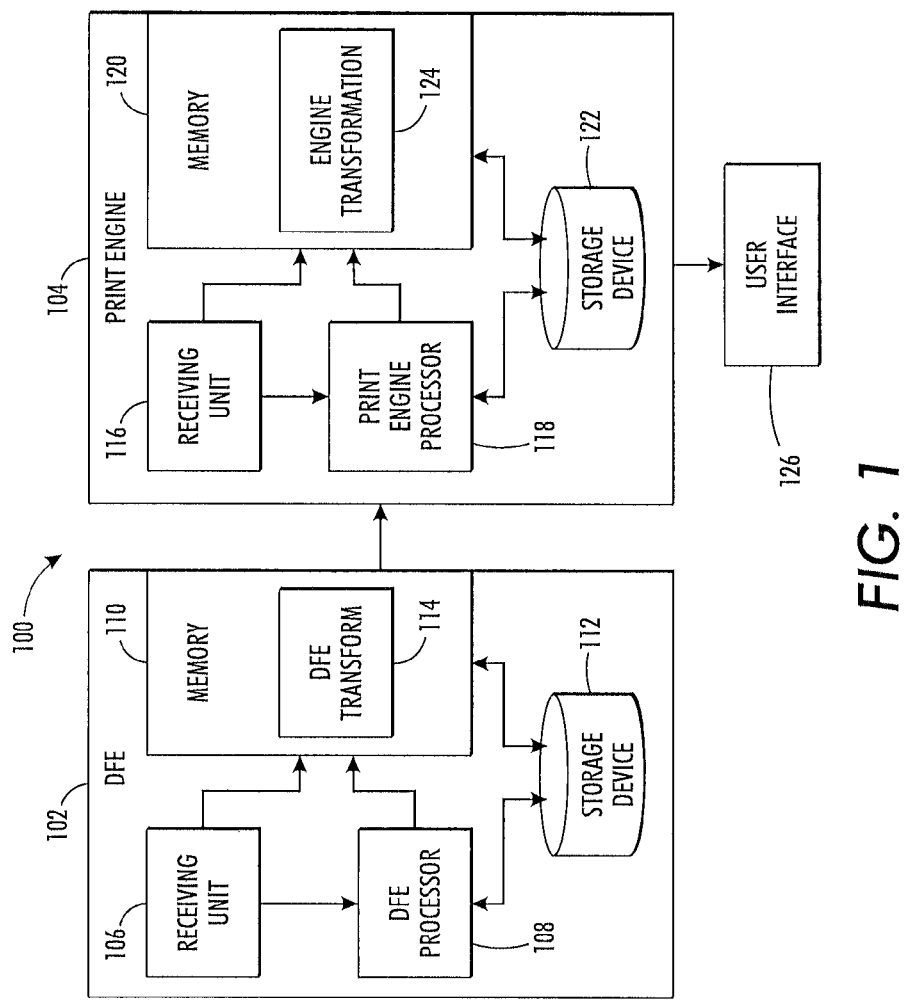
FIG. 1 is a block diagram of an exemplary color management system in accordance with an embodiment of the present disclosure.

In a cascade color management strategy, a fleet profile that represents a typical image printing system and having many profiling strategies incorporated with appropriate Gray Component Replacement (GCR) (i.e., is a procedure that determines the amount of black/gray to be printed with K vs. CMY) converts images to a set of typical CMYK image data. The print engine takes this set of typical CMYK image data and converts to its own device CMYK color space for printing. Advantages of a cascade color management strategy are that it can have one DFE with the fleet profile to drive a set of print engines so that cost will be lower, and it has a clean separation between the DFE and the print engine so that development of the DFE and the print engine color management system can be separated. In the cascade color management strategy, many elements of color management system are handled inside the fleet profile that resides in the DFE, while the variation of the individual print engine is handled by a multi-dimensional LUT that transforms from the fleet CMYK profile to the engine CMYK profile for printing and that resides inside the print engine. A unique requirement from this cascaded color management strategy is to construct the LUT that preserves the color management strategy of the fleet profile in the DFE. When the engine changes due to drifting or component replacement, the LUT has to be updated.

An input device or a DFE, as used herein, generally refers to an application that typically takes the form of a special purpose computer (such as an ASIC), as are widely known in the digital document reproduction arts. The DFE produces raster image data as well as other information for print engine control. The raster image data may be further processed by a processing device so as to prepare the data for consumption by a rendering device in a print engine, such as a raster output scanning device. The processing device may be associated with the input device or the DFE.

The present disclosure proposes an architecture that partitions the color management for an image printing system into two steps: 1) a transformation residing in the DFE or the input device that maps input source color space (RGB or L*a*b*) to a standardized N-color (e.g., sCMYK, sCMYKOV, sN-color, etc.) color space whose color gamut is a superset of the fleet of device or print engine gamuts; and 2) a transformation residing within each print engine that maps the standardized N-color color space to its (printer's) N-colorant color space (e.g., device CMYK, device CMYKOV, device N-color, etc.). The architecture of the present disclosure is configured to compensate for engine-to-engine variations, temporal variations, and multiple rendering intents such as colorimetric, perceptual, saturation, and others. Multiple extensions to the case of N to M-colorants (with unequal N and M) are also comprehended in the present architecture.

The present disclosure proposes using novel transforms so that separations are made clearly between DFEs and the print engines. The print engines contain all engine specific transforms that handle multiple rendering intents. The DFEs may use one fleet or global ICC profile that covers the entire printable space of one or more print engines.

The interface to the print engine is standardized color space to CMYK color space for a four color print engine. The interface may be extended to N-color space by using N dimensional transforms inside the print engine. The present disclosure provides an exemplary embodiment for four-color (CMYK) separations. It should be understood that the present method is equally applicable to a device capable of N>4. For example, if N=6 the colors may include: Cyan, Magenta, Yellow, Black, Orange, and Violet. Other N-color separations of various devices are intended to fall within the scope of the present disclosure.

FIG. 1 is a block diagram of an exemplary color management system 100 in accordance with an embodiment of the present disclosure.

The system 100 includes a DFE or input device 102 and a plurality of print engines 104. For clarity of illustration, only one print engine 104 is shown in and explained with respect to FIG. 1.

The DFE or input device 102 includes a receiving unit 106, an input processor 108, a memory 110, and a storage device 112. The receiving unit 106 of the DFE or input device is configured to receive a digital image in an input source color space. The receiving unit 106 is configured to receive color signals intended to be printed.

The DFE or input memory 110 is configured to store computer-executable instructions for carrying out the various procedures and performing the various functions described herein. The DFE or input memory 110 is configured to store an input or DFE transformation 114. The input or DFE transformation 114 is configured to map the input source color space (RGB or L*a*b*) to a standardized N-color (e.g., sCMYK, sCMYKOV, SN-color, etc.) space whose color gamut is a superset of the fleet of device or print engine color gamuts. That is, the DFE transformation 114 includes a color gamut coverage at least equal to color gamut coverage of all the print engines in the color management system. In one embodiment, the input or DFE transformation 114 is an input or DFE look-up table.

The DFE or input processor 108 is operatively associated with the receiving unit 106, the memory 110, and the storage device 112. The DFE or input processor 108 is configured to execute computer-executable instructions stored in the memory 110.

The DFE or input processor 108 is configured to transform, using the DFE or input transformation 114 stored on the DFE's memory 110, the digital image in the input source color space to a digital image in a standardized multi-color color space. As will be clear from the discussions below, this digital image in the standardized multi-color color space is then sent as an input to the plurality of the print engines, where each of the print engines have different number of colorants and/or different rendering intents.

The print engine 104 includes a receiving unit 116, a print engine processor 118, a memory 120, and a storage device 122.

The print engine 104 may mark xerographically; however, it will be appreciated that other marking technologies may be used, for example by ink-jet marking, ionographically marking or the like.

Each print engine 104 may be operatively connected one or more sources of printable substrate media, an output path and a finishing system. Each print engine 104 may be a multi-color engine having a plurality of imaging/development subsystems that are suitable for producing individual color images. A stacker device may also be provided for each print engine as known in the art.

The receiving unit 116 is configured to receive the digital image in the standardized multi-color color space from the DFE or input device 102.

The print engine memory 120 is configured to store computer-executable instructions for carrying out the various procedures and performing the various functions described herein. The print engine memory 120 is configured to store a print engine transformation 124. The print engine transformation 124 is configured to map the standardized N-color space (e.g., sCMYK, sCMYKOV, sN-color, etc.) to a particular printer's N-colorant space (e.g., device CMYK, device CMYKOV, device N-color, etc.). In one embodiment, the print engine transformation 124 is a print engine look-up table.

The print engine processor 118 is operatively associated with the receiving unit 116, the print engine memory 120, and the storage device 122. The print engine processor 118 is configured to execute computer-executable instructions stored in the memory 120. The print engine processor 118 is also configured to transform, using the print engine transformation 124 stored on the print engine's memory 124, the digital image in the standardized multi-color color space to a digital image in a print engine multi-color color space.

The present disclosure proposes building a standardized color space to device color space transform that takes into account multiple preferences such as colorimetric rendering intent, perceptual rendering intent, saturation rendering intent, and other customized rendering intents.

A standard CMYK to device CMYK color space transform thus built is a 4 to 4 color transform. The present disclosure uses the concatenation of two profiles: (1) a reference or global profile LUT that provides a transformation from a standardized CMYK (sCMYK) to L*a*b*/XYZ color space, and (2) a custom destination profile that provides transformation from L*a*b*/XYZ to a device CMYK color space. The reference/global profile LUT contains the gamut coverage same or higher than the gamut covered by the print engine. The custom destination profile is created for different rendering intents with appropriate gamut mapping and inversion algorithms. Standardized CMYK color space to device CMYK color space LUTs are then obtained using reference/global and custom destination profiles to create 4D LUTs with multiple rendering intents. These LUTs are then used inside the print engine for controlling color. In case of N-color system, standard CMYK color space becomes standard N-colors color space giving rise to N Dimensional (ND) LUTs inside the print engine.

First, a reference/global profile LUT is created. As noted above, the reference or global profile LUT provides a transformation from a standardized color space (sCMYK, sCMYKOV, sN-color, etc.) to L*a*b*/XYZ color space.

The procedure for creating the reference/global profile LUT generally includes 1) performing characterization on a well calibrated sufficiently large gamut printer and developing a CMYK to L*a*b* reference LUT, where the CMYK values of the reference LUT/profile become the standardized CMYK output from the DFE or image processing unit (e.g., cloud/grid/web etc.); 2) using a model such as the Neugebauer model to create the CMYK to L*a*b* reference LUT, where the parameters of the Neugebauer model may be set to produce a large gamut to cover that of all printers in consideration; and 3) using printer models from variety of printers, and unifying these printer models to create a largest CMYK to L*a*b* reference LUT.

The reference/global LUT is generally for a fixed CMYK color space or N-color space to L*a*b*/XYZ color space transform that is created a priori in the factory for a print engine with a similar or substantially large gamut. The reference profile LUT may also be a forward transform (i.e., a A2B tag) of an ICC profile when the profile is created on a fleet printer of the same class. The large gamut reference LUT/profile construction is a one-time process.

The techniques used for creating the reference/global profile LUT are described in greater detail, for example, in "Advances towards high quality color profiling" by L K Mestha, Marty Maltz, Raja Bala, Alvaro Gil, Yao Rong Wang, Stuart Schweid*, Matthew Hoffmann*, Debbie Wickham, Richard Howe (*PSG), published at the 2nd Annual XIG Conference, May 13-15, 2008, Xerox Corporation, Webster, N.Y., which is incorporated by reference herein in its entirety. Therefore, these techniques are not described in detail here.

The custom destination profiles are then created for various rendering intents. The techniques used for creating custom destination LUTs are described in detail, for example, in "Advances towards high quality color profiling" by L K Mestha, Marty Maltz, Raja Bala, Alvaro Gil, Yao Rong Wang, Stuart Schweid*, Matthew Hoffmann*, Debbie Wickham, Richard Howe (*Production Systems Group (PSG)), published at the 2nd Annual XIG Conference, May 13-15, 2008, Xerox Corporation, Webster, N.Y., which is incorporated by reference herein in its entirety. Therefore, these techniques are not described in detail here.

The method and system of the present disclosure concatenates the reference/global LUT/ICC profile with the custom destination profile for a given rendering intent. The 4D LUTs are stored in a hardware system such as a processor.

Figure 2:
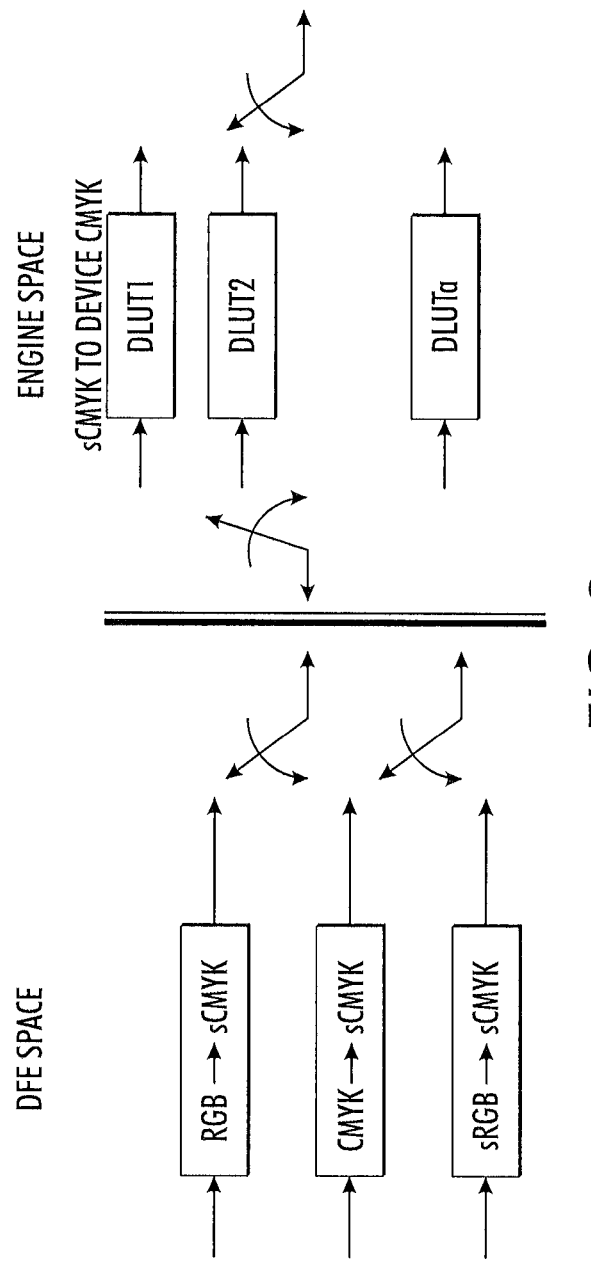
FIG. 2 is a schematic of a multi-intent color control architecture in accordance with an embodiment of the present disclosure.

FIG. 2 shows how the DLUTs (i.e., LUTs stored in the print engine) from 1 to q are arranged in parallel to indicate 4D LUTs per intent totaling upto q. That is, the engine space of FIG. 2 shows an example print engine with custom 4D/ND LUTs shown for 'q' rendering intents. For example, these stored DLUTs are selected by the user based on the need using a switch. Incoming CMYK images in a standardized CMYK color space are processed through a selected DLUT to create engine specific CMYK values for each pixel. CMYK values not on the 4D node are interpolated using tetrahedral or other multi-dimensional interpolation algorithms. These multi-dimensional interpolation algorithms are described in detail, for example, at Chapter 6 of "Control of Color Imaging Systems: Analysis and Design" by L. K. Mestha and S. Dianat, published in May, 2009 by CRC Press (ISBN: 9780849337468), which is incorporated by reference herein in its entirety.

In one embodiment, it is contemplated that the print engine may have custom 4D/ND LUTs for 'n' number of media. Also, for each media of the print engine, the print engine may have one or more custom 4D/ND LUTs for 'q' rendering intents.

This process enables the print engine to have image data in the standardized CMYK color space as input. This procedure is configured to handle all gamut mapping (e.g., clipping or compression methods) inside the 4D LUTs.

Referring to FIG. 2, the DFE image path is shown for a RGB to a standardized CMYK color space. This DFE image path is configured to handle incoming RGB images. Also, as shown in FIG. 2, a CMYK to a standardized CMYK color space DFE image path may be included to handle incoming CMYK images. As shown in FIG. 2, the DFE image path for a standard RGB (sRGB) color space to a standardized CMYK color space is configured to handle incoming sRGB images. The DFE may be configured as a processing module that is used to transform multiple color spaces to a standardized CMYK color space resident on the cloud/web/grid network. Therefore, with this architecture, all multiple print engines of similar or different color gamuts with multi-rendering intent DLUTs are configured to have the same standardized input from the DFE.

Figure 3:
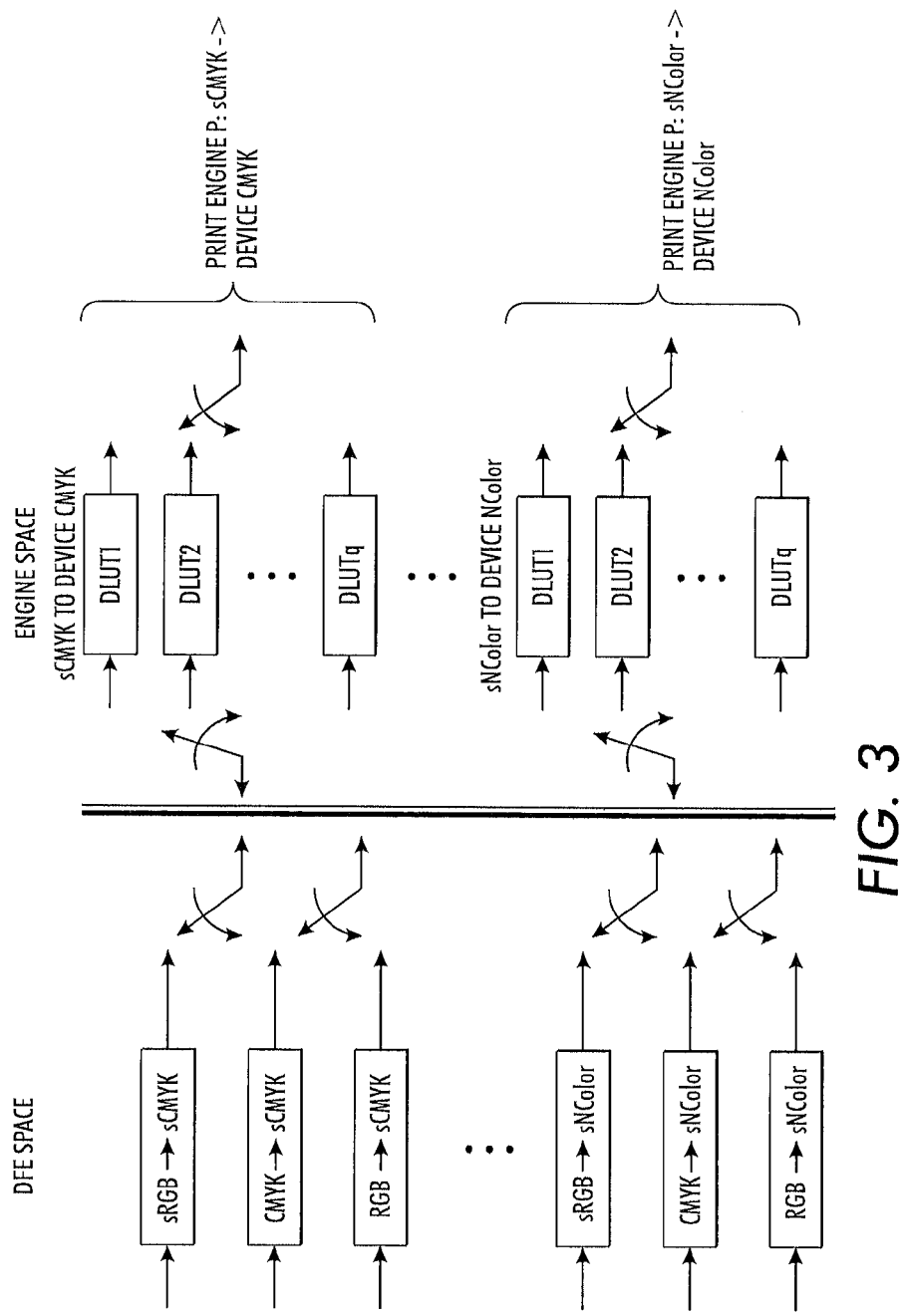
FIG. 3 is a schematic of a multi-intent color control architecture having a plurality of print engines with multiple rendering intents in accordance with another embodiment of the present disclosure.
Figure 4:
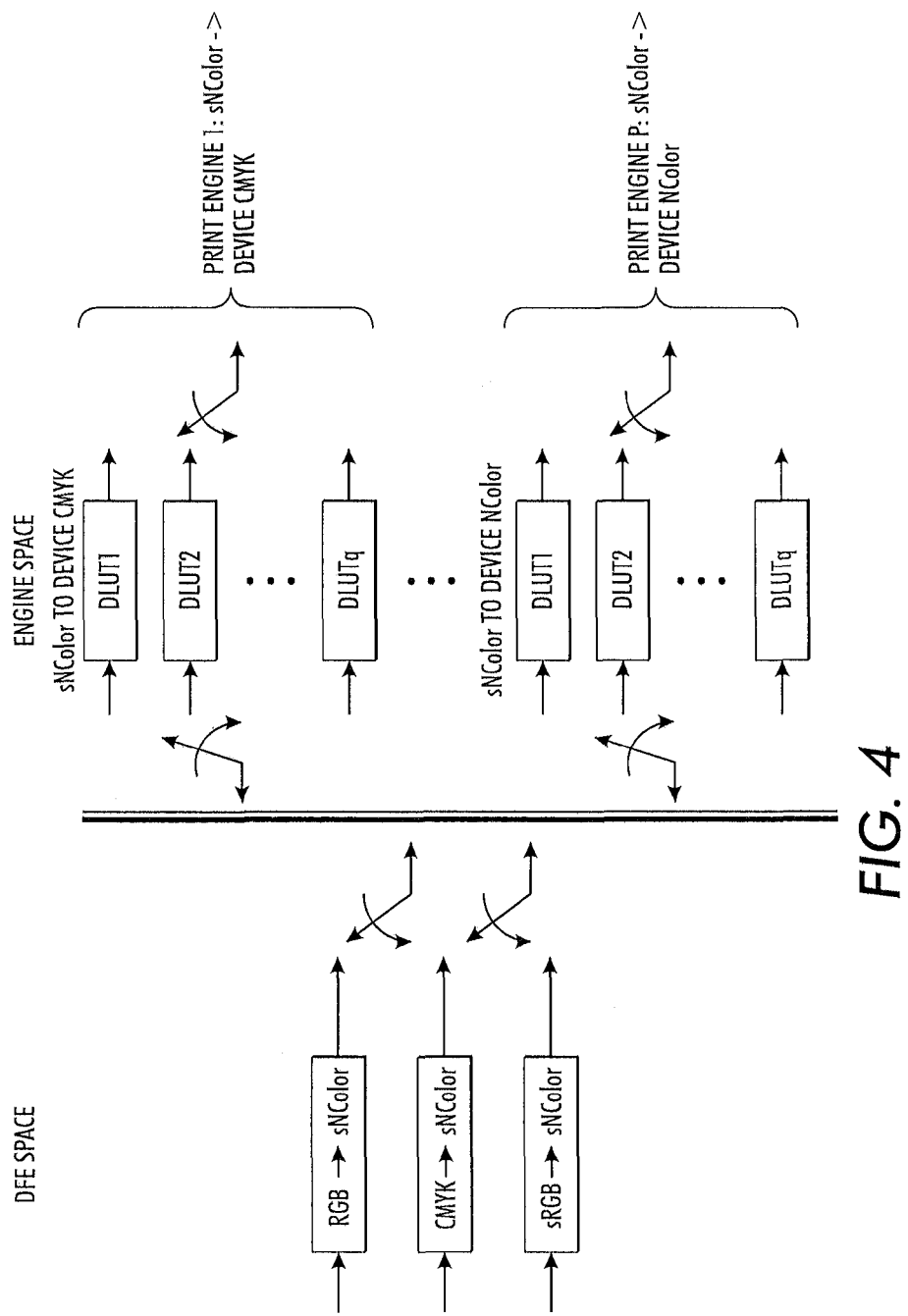
FIG. 4 is a schematic of a multi-intent color control architecture having a plurality of print engines with multiple rendering intents in accordance with yet another embodiment of the present disclosure.

The architecture shown in FIG. 2 may be further generalized with mixed print engine sets with different number of device colorants. For example, a set of engines using CMYK as separations, while other engines using CMYKOV as separations. FIG. 3 shows one such embodiment, and FIG. 4 shows another such embodiment.

The DFE provides a number of reference LUTs/profiles that are configured to transform for example, a sRGB color space, a CMYK color space, or a RGB color space to the standardized CMYK (i.e., sCMYK), standardized CMYKOV (i.e., sCMYKOV), or standardized N-color (i.e., sN-color) spaces. The standardized interface (e.g., sCMYK, sCMYKOV or sN-color) is in the local separation space when compared to the standard device independent color space (i.e., L*a*b* or XYZ) or Profile Connection Space as in ICC profile architecture.

In illustrated embodiment of FIG. 3, reference/global LUTs/profiles that are configured to transform, for example, a sRGB color space, a CMYK color space, or a RGB color space to a standardized CMYK (i.e., sCMYK) space and reference/global LUTs/profiles that are configured to transform, for example, a sRGB color space, a CMYK color space, or a RGB color space to a standardized N-color (i.e., sN-color) space are shown. The DFE may also include reference LUTs/profiles that are configured to transform for example, a sRGB color space, a CMYK color space, or a RGB color space to a standardized CMYKOV (i.e., sCMYKOV) space.

In one embodiment, the global/reference profile LUT is configured to cover the gamut equal to or substantially larger than the gamuts of all the printers. The global/reference profile LUT is configured to emit pixels to standardized CMYK color space, standardized CMYKOV color space or standardized N-color color space.

The DLUTs in each print engine transform the standardized CMYK (i.e., sCMYK), standardized CMYKOV (i.e., sCMYKOV), or standardized N-color (i.e., sN-color) spaces to device M-Color (M being the number of colorants of that specific print engine) color space for each rendering intent.

Rendering intents are known in the art. In general, a rendering intent is a descriptor of a transformation of the image colors to a color description native to the output device (e.g., image printing device or print engine). The transformation emphasizes features of the image that are most important to the user. Examples of rendering intents may include perceptual rendering intent, relative calorimetric rendering intent, saturation rendering intent, absolute calorimetric rendering intent, and any other customized rendering intents.

Selection of a rendering intent notifies the color image processor as to which set of tradeoffs is acceptable when rendering the image. Trades offs can be necessary due to limitations of the rendering device. For example, where the saturation rendering intent is selected the color image processor is notified that the saturation of the image should be preserved, perhaps at the expense of accuracy in hue and lightness.

Rendering intent selection can be accomplished through any conventional means. In one embodiment, desired rendering intents may be selected automatically or based on user input at the print engine console with a user interface. For example, referring to FIG. 1, the color management system 100 may further include a user interface 126 which enables a user to select a desired rendering intent based on user's need. The user interface 126 may be a graphical user interface (GUI). Such a user interface has the characteristic that a user may interact with the system using a cursor control device and/or via a touch-screen display, rather than solely via keyboard input device. The user interface or workstation, the DFE and the print engine of the color management system 100 may communicate with each other via a network.

For example, the user may use a keyboard to type in the name of a rendering intent. Preferably the user is provided with a list of rendering intents from which the user may make a selection. Of course, the user can opt not to make a rendering intent selection or to allow the color image processor to use a default rendering intent.

In FIG. 4, the DFE provides one reference/global LUT/profile from sRGB color space to sN-color color space, one reference LUT/profile from RGB color space to sN-color color space, and one reference LUT/profile from CMYK color space to sN-color color space. The DLUTs in each print engine transform the sN-color color space to M-Color color space (M being the number of colorants of that specific print engine) for each rendering intent.

The multi-rendering intent custom profiles (4D or ND) are created in the print engine with a sensor. These custom profiles are adjusted based on the print engine status using color sensors embedded inside or present outside the print engine.

The generalized architecture expands the scope of DFE and print engine interface to mix and match print engines with different color separations without imposing major constraints to DFEs. This generalized architecture provides abilities to handle interfaces to multiple color separations in a seamless fashion.

Figure 5:
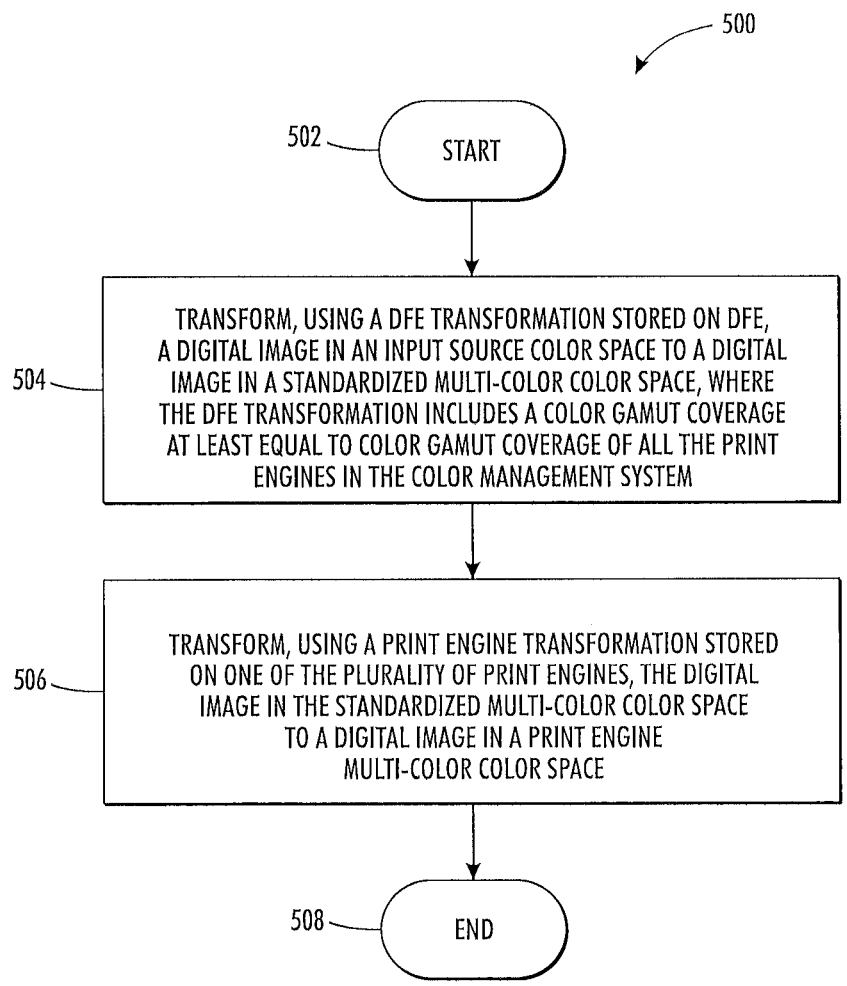
FIG. 5 shows a flowchart summarizing a method for providing an improved color consistency across a plurality of print engines in a color management system in accordance with an embodiment of the present disclosure.

FIG. 5 shows a flowchart summarizing a method 500 for providing an improved color consistency across a plurality of print engines in a color management system. The method 500 is implemented in a computer system comprising one or more processors 108 and 118 configured to execute one or more computer program modules. The method 500 begins at procedure 502. The plurality of print engines in the color management system has different number of colorants and different rendering intents.

Referring to FIGS. 1 and 5, at procedure 504, the DFE processor 108 is configured to transform, using the DFE transformation 114 stored on the DFE 102, a digital image in an input source color space to a digital image in a standardized multi-color color space. The DFE transformation 114 includes a color gamut coverage at least equal to color gamut coverage of all the print engines in the color management system. The method includes sending the digital image in the standard multi-color color space to at least one of the plurality of print engines.

Referring to FIGS. 1 and 5, at procedure 506 of the method 500, the print engine processor 118 is configured to transform, using a print engine transformation 124 stored on the print engine 104, the digital image in the standardized multi-color color space to a digital image in a print engine multi-color color space. The method also includes rendering the digital image in a print engine multi-color color space on a recording media. The method ends at procedure 508.

Benefits of the invention include simplifying the color management within the DFE and letting engine-to-engine and temporal and engine related color adjustments and control be the responsibility of the engine. As a result of this architecture, inputs received by the print engine are in a color space that is standardized and yet not gamut-constrained.

A color space, as used herein, generally refers to any standard color space that is commonly used to define or describe color.

A color transformation, as used herein, generally refers to the process of translating an input color space to an output color space. In color management systems, a color transformation converts each input color space, on a color by color basis, into an output color space using mathematical algorithms represented by multiple color profiles. A first color profile converts an input color space to a standardized color space. A second color profile converts the standardized color space to an output color space.

A standardized color space, as used herein, generally refers a color space that is defined according to a predetermined standard. That is, a standardized color space is a color space that is established in advance. The standardized color space includes image information in a standard image format that is common to all the plurality of print or marking engines in the system. For example, the standard color space may include CIELab or sRGB and exemplary image formats may include TIFF, JPG, PDF, etc.

A color gamut, as used herein, generally refers to a certain complete subset of colors. For example, a color gamut refers to the subset of colors which can be accurately represented within a given color space or by a certain output device. The color gamut of a printer is a multi-dimensional color space of a given volume with the axes of the color space being set or defined initially by the pigments used in the colorants of the primary colors such as, for example, cyan, magenta, yellow, and black. That is, the color gamut is defined by the interaction of these primary colors.

A Look-up Table (LUT), as used herein, generally refers to is a multi-dimensional table used to map colorant combinations to the color space of a target device. A LUT comprises a plurality of sub-hypercubes (or sub-cubes) arrayed on a structured grid in a four dimensional colorant space of a color marking device. Each vertex of each sub-cube of the structured grid is associated with a colorant formulation and a corresponding output color.

A global or reference profile LUT, as used herein, generally configured to translate an input color space to a standardized color space.

A custom or destination profile LUT, as used herein, generally configured to translate a standardized color space to the color space of a target marking or printing device.

A print engine, as used herein, generally refers to any device that applies colorants to or generates colorants on a surface to produce an image. The print engine renders the image data onto a medium to produce a hard copy thereof. A print engine may be any arrangement of hardware and associated software helpful in a printed image based on submitted image data in any form, such as a xerographic engine or a set of ink-jet print heads. A single print engine may be dedicated to creating a portion of a desired image, such as to create a single color separation for a full-color image; one page-side image in a machine that provides separate print engines for each side of a printed substrate; or providing a special type of partial image, such as a MICR image on a check.

A print engine processor, as used herein, generally refers to any arrangement, comprising hardware and/or software, for accepting image data in any form and suitably converting or otherwise applying the image data for use by a print engine.

The plurality or set of print systems, as described herein, generally includes monochrome or color digital document reproduction architectures, document scanning systems, a wide variety of printers/copiers, book/magazine/newspaper, digital printing presses, and other multi-function document reproduction systems. Such systems generally include a display device such as a CRT or touch screen along with one or more user interfaces such as a keyboard, mouse, keypad, touchpad, and the like, for entering data and configuring device-specific settings to optimize image quality and performance. Such complex devices further incorporate an image processing or color management system for processing image data.

A processor, as used herein, generally could be dedicated hardware like ASICs or FPGAs, software, or a combination of dedicated hardware and software. For example, a processor may be a microprocessor, a microcontroller, a virtual processor on a virtual machine, circuit elements, logic circuits or devices, an ASICS microchip, soft microprocessor, software emulation of hardware or other device sufficient for processing instructions. The processor may comprise a plurality of modules for processing the data for storage and/or output, for example. It should be noted that the types of modules and processes performed thereon should not be limited to those described herein. For example, more or less devices may be used to perform the described processing procedures. Additionally or alternatively, processor may be in communication with memory. Memory may include data and/or instructions to be executed by the processor. The memory is capable of storing data used by or produced by the processor. The type of memory should not be limiting; for example, the memory may alternatively include random access memory (RAM).

A printer model, as used herein, generally relates inputs in device-dependent color space to outputs in device-independent color space. One example printer model has the form of a 4-D LUT for a CMYK printer.

While the present disclosure has been described in connection with what is presently considered to be the most practical and preferred embodiment, it is to be understood that it is capable of further modifications and is not to be limited to the disclosed embodiment, and this application is intended to cover any variations, uses, equivalent arrangements or adaptations of the present disclosure following, in general, the principles of the present disclosure and including such departures from the present disclosure as come within known or customary practice in the art to which the present disclosure pertains, and as may be applied to the essential features hereinbefore set forth and followed in the spirit and scope of the appended claims.

What is claimed is:

1. A color management system, comprising:
   at least an input device configured to receive a digital image in an input source color space;
   at least an input processor operatively associated with the input device, the input processor configured to transform, using an input transformation stored on the input device, the digital image in the input source color space to a digital image in a standardized multi-color color space; and a plurality of print engine processors, each print engine processor being operatively associated with one of a plurality of print engines in the color management system, each print engine processor configured to:
receive the digital image in the standardized multi-color color space from the input processor, and
transform, using a print engine transformation stored on the print engine, the digital image in the standardized multi-color color space to a digital image in a print engine multi-color color space,
wherein the input transformation comprises a color gamut coverage at least equal to color gamut coverage of all the print engines in the color management system.

2. The color management system of claim 1, wherein the input transformation includes one or more input look-up tables that are configured to map the input source color space to the standardized multi-color color space.

3. The color management system of claim 2, wherein the standardized multi-color color space is a color space that is common to all the plurality of print engines in the color management system.

4. A color management system, comprising:
at least an input device configured to receive a digital image in an input source color space;
at least an input processor operatively associated with the input device, the input processor configured to transform, using an input transformation stored on the input device, the digital image in the input source color space to a digital image in a standardized multi-color color space; and
a plurality of print engine processors, each print engine processor being operatively associated with one of a plurality of print engines in the color management system, each print engine processor configured to:
receive the digital image in the standardized multi-color color space from the input processor, and
transform, using a print engine transformation stored on the print engine, the digital image in the standardized multi-color color space to a digital image in a print engine multi-color color space,
wherein the input transformation comprises a color gamut coverage at least equal to color gamut coverage of all the print engines in the color management system, and
wherein the print engine transformation of each print engine includes one or more print engine look-up tables that are configured to:
(i) map the standardized multi-color color space to the print engine multi-color color space; and
(ii) handle different colorants of the print engine and multiple rendering intents.

5. The color management system of claim 4, wherein each print engine look-up table of the print engine is associated with a predetermined rendering intent.

6. The color management system of claim 5, wherein the predetermined rendering intent is selected automatically or based on user input.

7. The color management system of claim 1, wherein the input source color space includes RGB color space, CMYK color space, sRGB color space, or L*a*b* color space.

8. The color management system of claim 1, wherein the standardized multi-color color space includes standardized CMYK (i.e., sCMYK) color space, standardized CMYKOV (i.e., sCMYKOV) color space, or standardized N-color (i.e., sN-color) color space.

9. The color management system of claim 1, wherein the print engine multi-color color space includes print engine CMYK color space, print engine CMYKOV color space, or print engine N-color color space.

10. The color management system of claim 1, wherein the input transformation is configured to emit pixels to standardized CMYK or standardized N-color formulations.

11. The color management system of claim 1, wherein the input device is a Digital Front End (DFE).

12. A method for providing an improved color consistency across a plurality of print engines in a color management system, the plurality of print engines having different number of colorants and different rendering intents, each print engine having a print engine processor operatively associated therewith, the method is implemented in a computer system comprising one or more processors configured to execute one or more computer program modules, the method comprising:
transforming, using an input transformation stored on at least an input device, a digital image in an input source color space to a digital image in a standardized multi-color color space; and
transforming, using a print engine transformation stored on one of the plurality of print engines, the digital image in the standardized multi-color color space to a digital image in a print engine multi-color color space,
wherein the input transformation comprises a color gamut coverage at least equal to color gamut coverage of all the print engines in the color management system.

13. The method of claim 12, wherein the input transformation includes one or more input look-up tables that are configured to map the input source color space to the standardized multi-color color space.

14. The method of claim 13, wherein the standardized multi-color color space is a color space that is common to all the plurality of print engines in the color management system.

15. A method for providing an improved color consistency across a plurality of print engines in a color management system, the plurality of print engines having different number of colorants and different rendering intents, each print engine having a print engine processor operatively associated therewith, the method is implemented in a computer system comprising one or more processors configured to execute one or more computer program modules, the method comprising:
transforming, using an input transformation stored on at least an input device, a digital image in an input source color space to a digital image in a standardized multi-color color space; and
transforming, using a print engine transformation stored on one of the plurality of print engines, the digital image in the standardized multi-color color space to a digital image in a print engine multi-color color space,
wherein the input transformation comprises a color gamut coverage at least equal to color gamut coverage of all the print engines in the color management system, and wherein the print engine transformation of each print engine includes one or more print engine look-up tables that are configured to:
(i) map the standardized multi-color color space to the print engine multi-color color space; and
(ii) handle different colorants of the print engine and multiple rendering intents.

16. The method of claim 15, wherein each print engine look-up table of the print engine is associated with a predetermined rendering intent.

17. The method of claim 16, wherein the predetermined rendering intent is selected automatically or based on user input.

18. The method of claim 12, wherein the input source color space includes RGB color space, CMYK color space, sRGB color space, or L*a*b* color space.

19. The method of claim 12, wherein the standardized multi-color color space includes standardized CMYK (i.e., sCMYK) color space, standardized CMYKOV (i.e., sCMYKOV) color space, or standardized N-color (i.e., sN-color) color space.

20. The method of claim 12, wherein the print engine multi-color color space includes print engine CMYK color space, print engine CMYKOV color space, or print engine N-color color space.

21. The method of claim 12, wherein the input transformation is configured to emit pixels to standardized CMYK or standardized N-color formulations.

* * * * *